United States Patent [19]

Omura et al.

[11] Patent Number: 4,986,125
[45] Date of Patent: Jan. 22, 1991

[54] ULTRASONIC MICROSCOPE

[75] Inventors: Yasuhiro Omura; Mitsugu Sakai, both of Hachioji; Koichi Karaki, Hino; Yasuo Sasaki, Hachioji, all of Japan

[73] Assignee: Olympus Optical Co., Ltd., Tokyo, Japan

[21] Appl. No.: 460,274

[22] Filed: Jan. 2, 1990

[30] Foreign Application Priority Data

Jan. 19, 1989 [JP] Japan ............... 1-3877[U]

[51] Int. Cl.$^5$ .................................. G01N 29/00
[52] U.S. Cl. ........................................ 73/606
[58] Field of Search ............. 73/606, 615, 633, 621

[56] References Cited

U.S. PATENT DOCUMENTS 4,646,573 3/1987 Stoll ............................. 73/606
4,683,751 8/1987 Imade et al. ................. 73/606

FOREIGN PATENT DOCUMENTS 57-53655 3/1982 Japan ........................... 73/606
62-231159 10/1987 Japan ........................... 73/606

OTHER PUBLICATIONS

"The Journal of Acoustic Society of America"; Cryogenic Acoustic Microscopy: J. Heiserman et al., 67(5), May 1980, pp. 1629-1637.

Primary Examiner—Hezron E. Williams
Assistant Examiner—Louis M. Arana
Attorney, Agent, or Firm—Frishauf, Holtz, Goodman & Woodward

[57] ABSTRACT

A supersonic microscope comprises a container for containing a liquid nitrogen, and an acoustic lens housed in the container to emit a supersonic beam onto the view face of a sample. A volume-variable member is provided in the liquid so that its upper part is extended from the top surface of the liquid. When the observing of the sample, the vertical position of the member is changed for moving the top surface of the liquid nitrogen up and down so that the top surface of the liquid contacts the view face of the sample.

11 Claims, 7 Drawing Sheets

ULTRASONIC MICROSCOPE

BACKGROUND OF THE INVENTION

1. Field of the Invention

The present invention relates to a supersonic microscope intended to scan that face of a sample which is to be viewed through the microscope with supersonic beam and, more particularly, it relates to a supersonic microscope intended to use, as the coupler liquid, a low temperature liquid such as nitrogen, argon and helium liquids.

2. Description of the Related Art

The supersonic microscope which has been recently developed attracts attention these days as a third microscope following the optical and electronic ones. The supersonic microscope can obtain the image of a sample in such a way that supersonic beam is focused onto the viewed face of the sample by means of an acoustic lens to two-dimensionally scan the face of the sample. When a supersonic wave of high frequencies (ranging from several hundreds MHz to several GHz) is used to increase resolving power in the case of this microscope, the interval between the acoustic lens and the sample must be made smaller as the frequency of the supersonic wave becomes higher because the acoustic absorption ratio of coupler liquid (or water) is proportional to the square of frequency. The interval between the acoustic lens and the sample is defined by the curvature radius of the acoustic lens. An acoustic lens having a small radius of curvature must be used to shorten the interval. In a case where the frequency of supersonic wave used is several GHz, for example, the curvature radius of acoustic lens must be made smaller than several tens $\mu$m. It is extremely difficult to make an acoustic lens which has such a finely curved surface. Even if such acoustic lens can be made, it will raise the cost of the microscope.

To enhance resolving power without setting the curvature radius of acoustic lens to the above-mentioned value, there has been provided another supersonic microscope (which will be hereinafter referred to as a low temperature supersonic microscope) intended to use, as coupler liquid, a low temperature liquid having a lower sound speed than that of water, such as nitrogen, argon and helium liquids and to scan the viewed face of sample in this low temperature liquid. The supersonic microscope of this type disclosed in U.S. Pat. Ser. No. 235,544, for example, temporarily raises the pressure of a container in which the low temperature liquid is contained to prevent the image of a sample from being blurred by the boiling of the low temperature liquid in the course of scanning or viewing the sample. Even when the image of the sample is created in this manner, it has still blurred portions. This is because the surface of the low temperature liquid which is under pressure is rippled by those vibrations which are caused by the acoustic lens scanning in directions X and Y and also caused by outside factors. Therefore, images of samples viewed through the conventional supersonic microscopes were not quite but still a little blurred.

SUMMARY OF THE INVENTION

The present invention relates to a supersonic microscope capable of creating images neither deflected nor blurred when samples are viewed through the microscope.

BRIEF DESCRIPTION OF THE DRAWINGS

FIGS. 1 through 6 show a first embodiment of the supersonic microscope according to the present invention, in which:

FIG. 1 is a vertically-sectioned view showing the microscope;

FIG. 2 is a view showing a system for holding the sample holder drawn;

FIG. 3 is a perspective view showing a system for positioning the sample holder;

FIG. 4 is a view showing the front end of a sample inserting rod;

FIGS. 5 and 6 are views for explaining the behavior of the microscope;

DETAILED DESCRIPTION OF THE PREFERRED EMBODIMENTS

Figure 1:
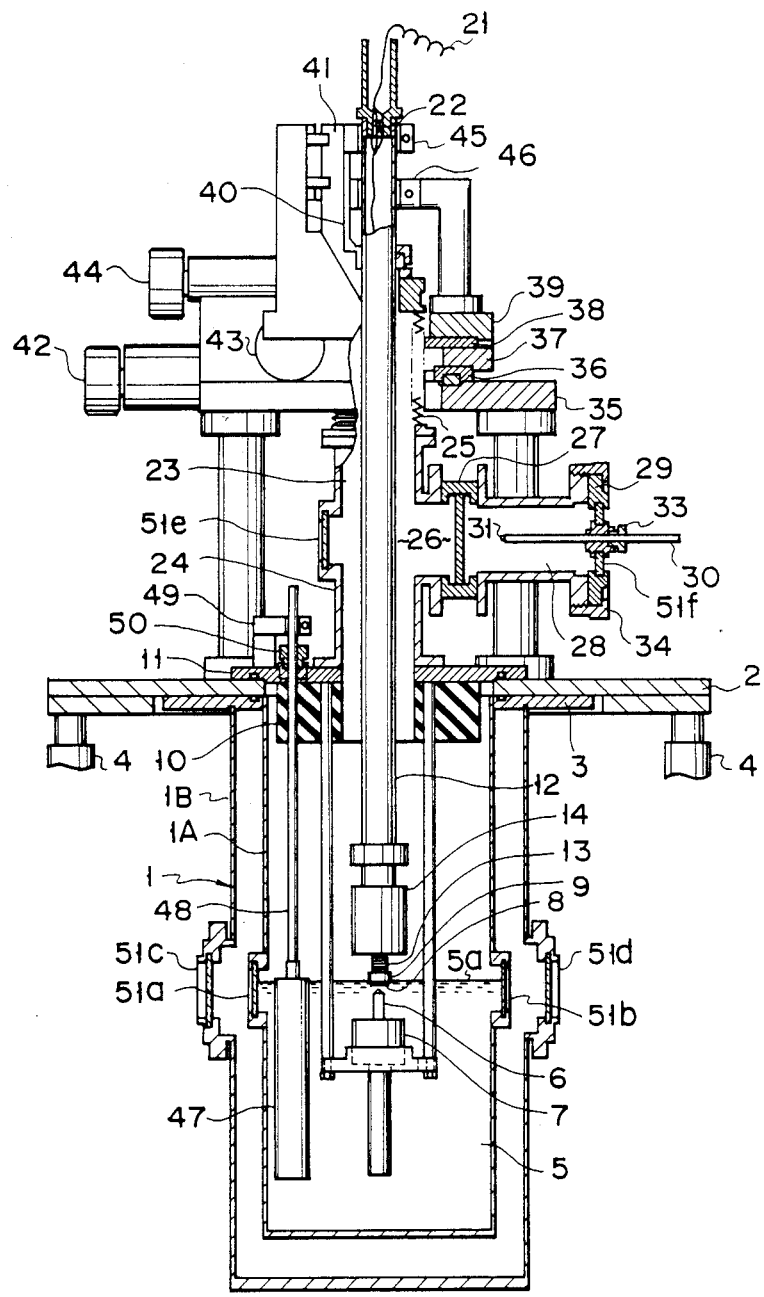

FIG. 1 is a vertically-sectioned view showing one embodiment of the supersonic microscope according to the present invention. Cylindrical heat-insulating container 1 having an opening on the top is air-tightly fixed to the underside of base plate 2, which also has an opening, through flange 3. Base plate 2 is horizontally supported on a support stand (not shown) by plural air dampers 4 which are connected to the underside of base plate 2. Heat-insulating container 1 is of the double type comprising inner and outer vessels 1A and 1B. The space between inner and outer vessels 1A and 1B is made vacuum to prevent temperature outside the container 1 from being transmitted from outer vessel 1B to inner one 1A to heat coupler liquid in container 1.

Liquid nitrogen 5, which serves as a coupler liquid, and acoustic lens 6 are housed in inner vessel 1A. Acoustic lens 6 is supported on XY scanner 7 with its supersonic beam injector directed upward, and can be moved under this state in a plane X-Y perpendicular to the paper sheet on which FIG. 1 is drawn. Sample holder 9 holds sample 8 so that its measured surface is directed to the acoustic lens and located above acoustic lens 6. Ring-shaped heat insulator 10 is arranged in the opening at the top of inner vessel 1A to prevent heat from entering into container 1 through the opening. It is attached to the underside of lid 11 which closes the opening of base plate 2. Lid 11 is provided in the center thereof with a circular opening which corresponds to the opening of ring-shaped heat insulator 10 and through which inner vessel 1A is communicated with gas-tight chamber 23 which will be described later.

Sample holder 9 is attached to the lower end of sample rod 12, which extends vertically through gas-tight chamber 23 and enters into inner vessel 1A through openings of lid 11 and heat insulator 10. Sample holder 9 is made of non-magnetic material and sample rod 12 has at the lower end portion thereof system 13 for holding sample holder 9 drawn. Sample rod 12 also has focusing system 14 above system 13. Focusing system 14 is intended to adjust the focusing point of acoustic lens 6, driving sample holder 9 in direction Z (or vertical direction) by means of voice coils.

Figure 2:
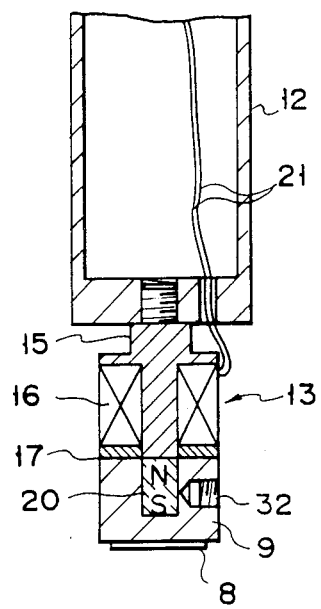
Figure 3:
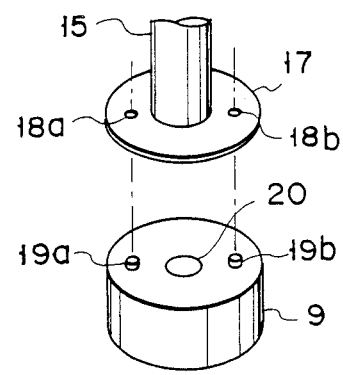

System 13 for drawing sample holder includes core 15 made of magnetic material and screwed into the lower end of sample rod 12 at the top thereof, coil 16 wound round core 15, and ring-shaped outer lid 17 drawn onto the lower end of core 15 and made of non-magnetic material, as shown in FIG. 2 (in which focusing system 14 is not shown). When power is supplied to coil 16, magnetic field is generated to draw and hold sample holder 9 to outer lid 17. As shown in FIG. 3, outer lid 17 has two positioning holes 18a and 18b separated from each other by a predetermined distance. Two positioning pins 19a and 19b are erected from the top of sample holder 9 to enter into their corresponding positioning holes 18a and 18b of outer lid 17. Permanent magnet 20 is embedded in sample holder 9, which can also be drawn to outer lid 17 due to the magnetic force of this permanent magnet 20. This is because liquid nitrogen 5 is boiled by the heating of coil 16 to make images blurred or doubled when excessive power is supplied to coil 16 in gas-tight chamber 23.

Sample rod 12 is made hollow and lead lines 21 through which power is supplied to systems 13 and 14 are introduced outside from these systems, passing through sample rod 12 and hermetic seal section 22 on the top of sample rod 12. Sample rod 12 can move up and down in gas-tight chamber 23 located above heat-insulating container 1. Gas-tight chamber 23 is defined by cylindrical sleeve 24 gas-tightly fixed onto the top of lid 11, bellows 25 located on the top of cylindrical sleeve 24, and the like. Cylindrical sleeve 24 is provided with sample inserting opening 26 at the peripheral wall thereof. A cylindrical body having vacuum dehydration chamber 28 therein is connected to the periphery of sample inserting opening 26 through gate valve 27. Gas-tight and vacuum dehydration chambers 23 and 28 are selectively communicated with and sealed from each other by gate valve 27. Window 51f is attached to the outer end of the cylindrical body, which has vacuum dehydration chamber 28 therein, through outer flange 29. As the result, vacuum dehydration chamber 28 can be kept gas-tight from outside. Sample inserting rod 30 is inserted into vacuum dehydration chamber 28 in a direction perpendicular to sample rod 12, passing through the central hole of viewing window 51f, and sample exchange can be carried out, as will be described below, using this sample inserting rod 30.

Figure 4:
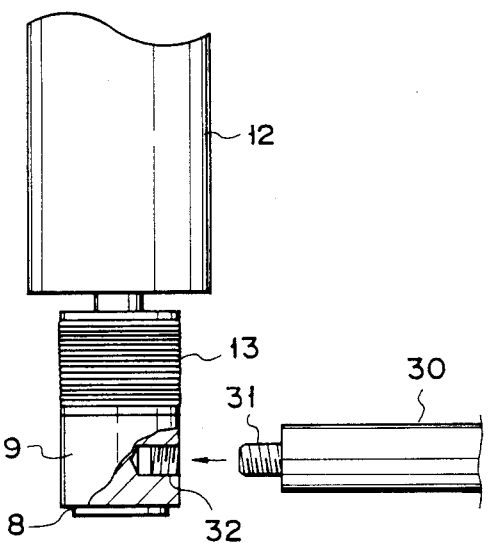

As shown in FIG. 4, threaded portion 31 is projected from the front end of sample inserting rod 30. When this threaded portion 31 is screwed into screw hole 32 in the peripheral wall of sample holder 9, sample holder 9 can be transferred by sample inserting rod 30. This sample inserting rod 30 is air-tightly passed through viewing window 51f by means of an O-ring and cap screw 33. Outer flange 29 can be detached from the opening of vacuum dehydration chamber 28 when clamp ring 34 which is screwed onto the outer end of the cylindrical body with outer flange 29 sandwiched is loosened.

Stage base 35 is located above base plate 2 and horizontally supported on plural pole braces, as shown in FIG. 1. Stage 37 for moving sample rod 12 in direction Y (or direction perpendicular to the paper sheet on which FIG. 1 is drawn) is mounted on stage base 35 through guide rail 36. Another stage 39 for moving sample rod in direction X (or right and left in FIG. 1) is mounted on stage 37 through guide rail 38. Further stage 41 for moving sample rod 12 in direction Z (or up and down in FIG. 1) is mounted on stage 39 through guide rail 40. These stages 37, 39 and 41 are driven by motors to move along their respective guide rails. Manual adjusting dial meters 42, 43 and 44 are attached to these motors, respectively. Stages 39 and 41 are provided with clamps 45 and 46 for clamping and fixing sample rod 12 and they move sample rod 12 through these clamps 45 and 46, while stage 37 moves it in direction Y through stage 39.

Float 47 for adjusting surface 5a of liquid nitrogen 5 at a certain level is housed in inner vessel 1A. Float 47 is formed of a cylinder made by a thin metal plate welded and it is provided with small holes at its top to prevent liquid nitrogen 5 in container 1 from being heated by gas in its hollow portion during the sample viewing process or to effectively cool its hollow portion by liquid nitrogen 5 before the sample viewing process. It is attached to the lower end of float support rod 48, which extends, freely movable in the vertical direction. Through lid 11 and heat insulator 10 and enters into inner vessel 1A. Float support rod 48 is detachably clamped by clamp 49 which is erected from the top of base plate 2 and it can be fixed at any optional position where it is kept vertical. It is air-tightly passed through lid 11 by means of an O-ring and cap screw 50. Reference numerals 51a, 51b, 51c, 51d and 51e in FIG. 1 represent viewing windows similar to the one 51f.

Figure 5:
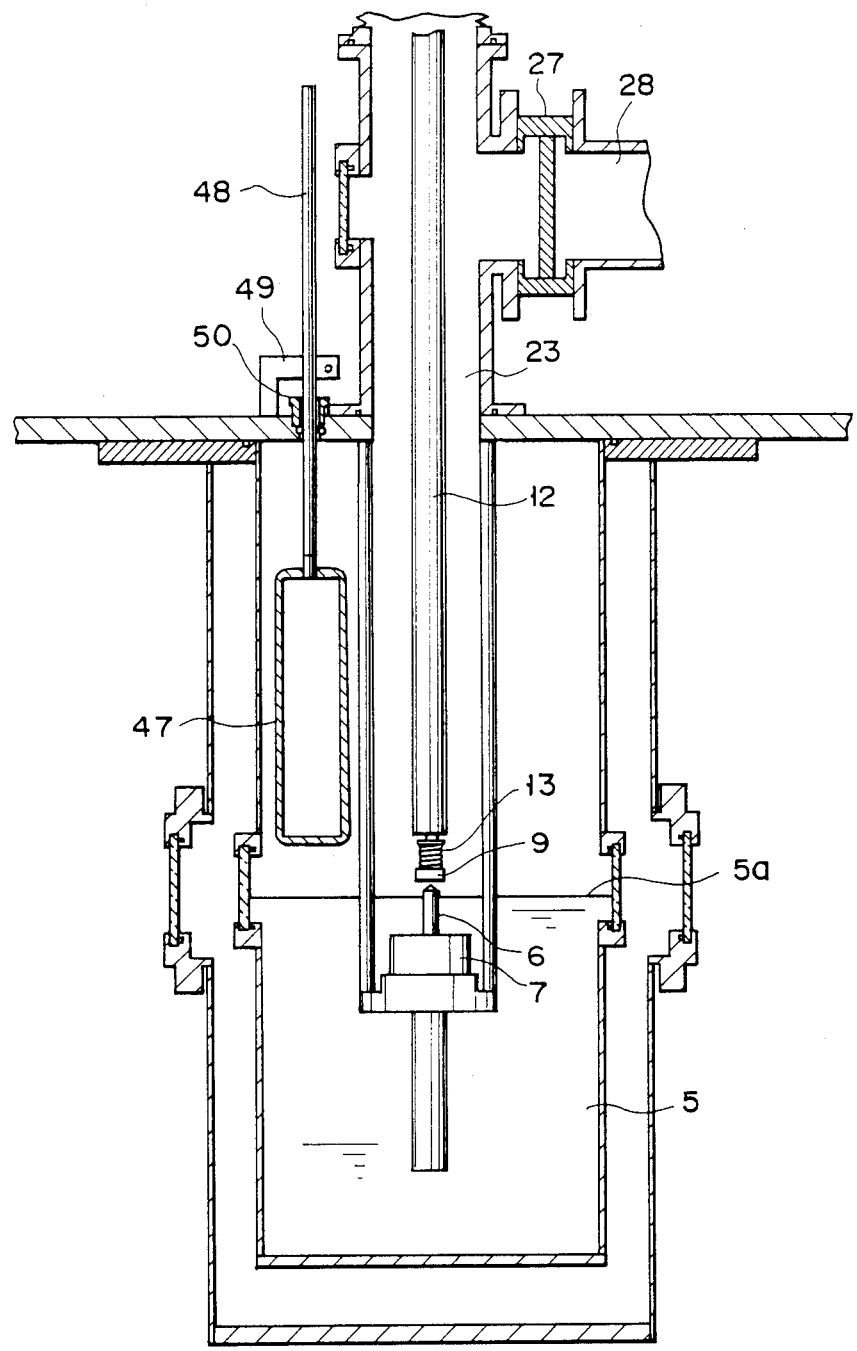
Figure 6:
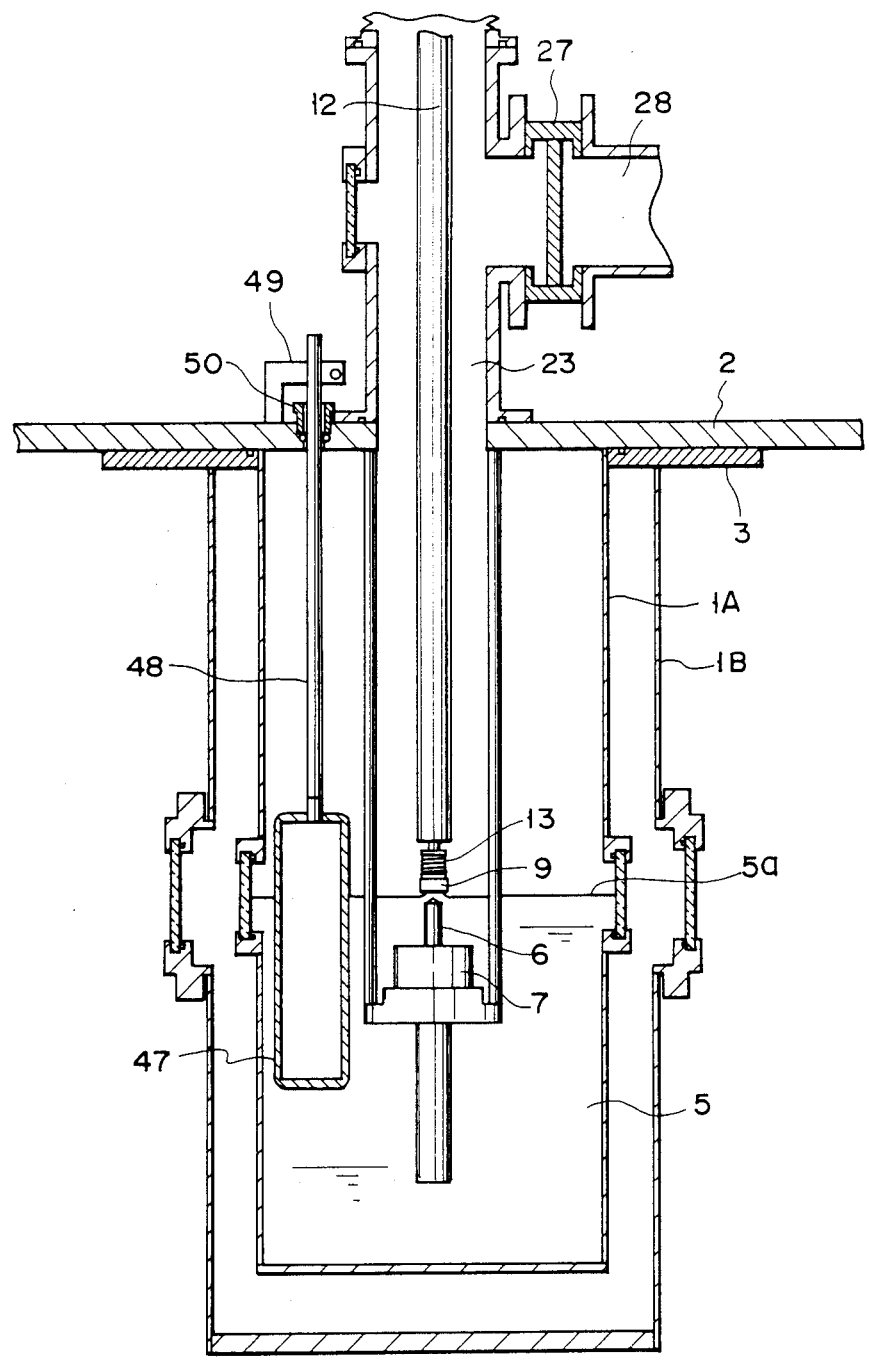

When sample 8 supported on the lower end of sample rod 12 is to be viewed through the supersonic microscope having the above-described arrangement, the interval between acoustic lens 6 and sample 8 is adjusted to a predetermined distance, as shown in FIG. 5. Clamp 49 is then loosened and float 47 is moved downward through float support rod 48 to raise surface 5a of liquid nitrogen 5 in container 1. When sample 8 is contacted with surface 5a of liquid nitrogen 5, as shown in FIG. 6, float 47 is fixed and sample 8 is viewed under this state.

Figure 7A:
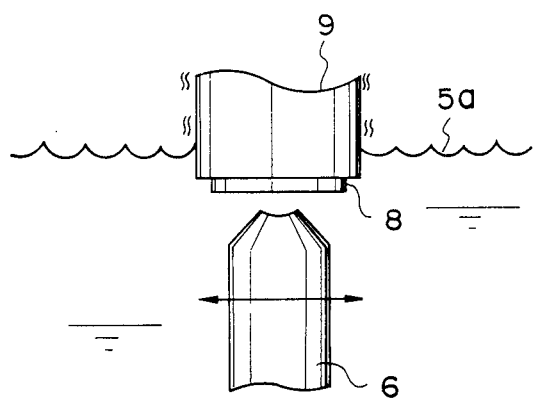
FIGS. 7A and 7B are views showing the conventional supersonic microscope and the new one of the present invention which are under operation to view samples.
Figure 7B:
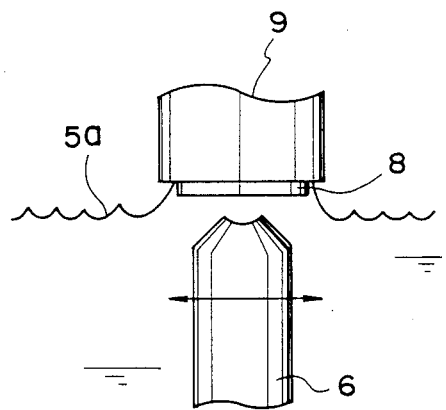

FIGS. 7A and 7B show samples viewed through the conventional supersonic microscope and the one of the present invention. As apparent from FIGS. 7A and 7B, sample observation is carried out, keeping sample 8 located under surface 5a of liquid nitrogen 5, in the conventional case. This causes sample 8 to be influenced by rippling surface 5a of liquid nitrogen 5 so that sample 8 thus imaged can become blurred. In the case of the present invention, however, sample observation is conducted keeping sample 8 contacted with surface 5a of liquid nitrogen 5. Sample 8 can be thus kept not influenced by rippling surface 5a of liquid nitrogen 5, thereby enabling the image of sample 8 viewed to be kept not blurred.

Figure 8:
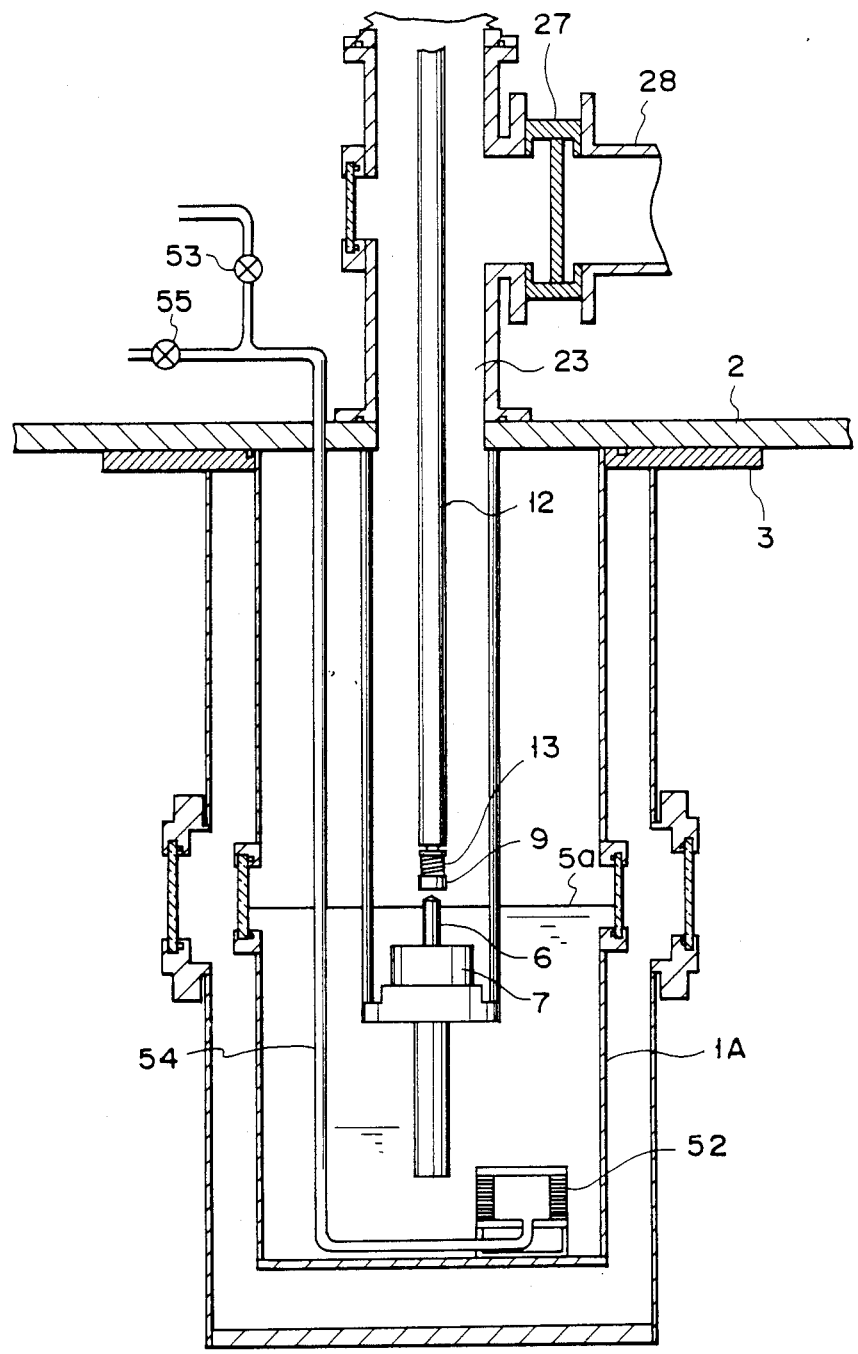
FIGS. 8 and 9 are views showing a second embodiment of the supersonic microscope according to the present invention which is in the course of viewing a sample.
Figure 9:
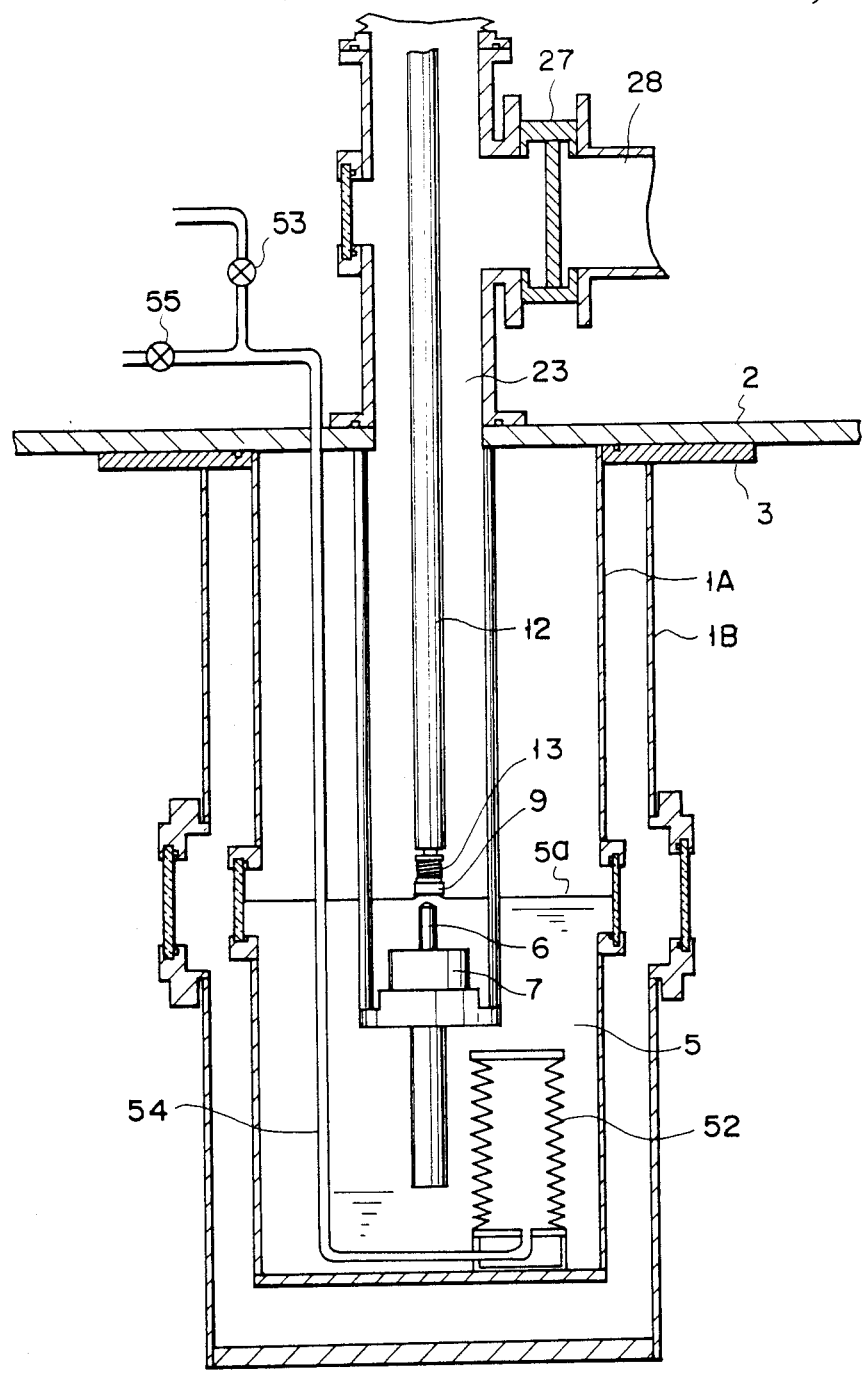

FIG. 8 shows a second embodiment of the supersonic microscope according to the present invention. Same components as those in the first embodiment will be denoted by same reference numerals and description on these components will be omitted accordingly. Bellows 52 is located on the bottom of inner vessel 1A and high pressure gas is introduced into bellows 52 through valve 53 and pipe 54. When high pressure gas is introduced into bellows 52 on the bottom of inner vessel 1A in this manner, bellows 52 is expanded by gas pressure as shown in FIG. 9, and when valve 55 is opened, expanded bellows 52 is shrunk by the hydrostatic pressure of liquid nitrogen 5. Surface 5a of liquid nitrogen 5 can be thus adjusted, as seen in the first example, by expanding and shrinking bellows 52. When gas (or He, for example) having a boiling point lower than that of liquid nitrogen 5 is introduced into bellows 52, it can prevent liquid nitrogen 5 from being boiled.

Although low temperature liquid such as liquid nitrogen has been used as coupler liquid in the first and second examples, the present invention is not limited to it but can be applied to those supersonic microscopes which use water as coupler liquid.

According to the present invention as described above, the means is provided to adjust the surface of coupler liquid and sample observation is carried out keeping the viewed surface of a sample contacted with the surface of coupler liquid by means of this liquid surface adjuster means. This can keep the sample not influenced by the rippling surface of coupler liquid, thereby enabling the sample to be clearly imaged.

What is claimed is:

1. A supersonic microscope, comprising:
    a container for containing a coupler liquid;
    an acoustic lens housed in the container to emit a supersonic beam;
    means for holding a sample in the container so that a face of the sample to be viewed faces the acoustic lens;
    driver means for relatively moving the acoustic lens and the sample in directions X and Y to scan the sample with the supersonic beam; and
    contact means for contacting the viewed face of the sample with the surface of the coupler liquid when sample observation is to be carried out.

2. The supersonic microscope according to claim 1, wherein said contact means includes surface moving means for moving the surface of the coupler liquid up and down in the container to contact the surface of the coupler liquid with the viewed face of the sample.

3. The supersonic microscope according to claim 2, wherein said surface moving means includes:
    a volume-variable member located in the coupler liquid and capable of changing its volume in the coupler liquid; and
    driver means for driving the volume-variable member to change the volume of the volume-variable member in the coupler liquid.

4. The supersonic microscope according to claim 2, wherein said surface moving means includes:
    a first member located at least partially in the coupler liquid; and
    a second member connected to the first member and serving to move the first member upward to thereby lower the surface of the coupler liquid in the container.

5. The supersonic microscope according to claim 4, wherein said first member includes a hollow float.

6. The supersonic microscope according to claim 3, wherein:
    said volume-variable member includes an expansible hollow member; and
    said driver means includes supply means connected to the expansible hollow member for supplying a predetermined amount of liquid into the interior of the expansible hollow member to control the expanding volume of the expansible hollow member.

7. The supersonic microscope according to claim 6, wherein said expansible hollow member comprises a hollow bellows connected to the supply means, said hollow bellows being expandable in size and shrinkable in size responsive to the supply of the liquid from the supply means to the interior of said hollow bellows.

8. The supersonic microscope according to claim 5, wherein said second member comprises a support rod coupled to said hollow float for moving said hollow float upward and downward in the coupler liquid in the container.

9. The supersonic microscope according to claim 3, wherein said driver means drives the volume-variable member to linearly change the volume of the volume-variable member in the coupler liquid.

10. The supersonic microscope according to claim 6, wherein said supply means supplies the liquid to the interior of the expansible hollow member to linearly control the expanding volume of the expansible hollow member.

11. The supersonic microscope according to claim 7, wherein said supply means supplies liquid into the interior of the hollow bellows to linearly control the expanding volume of the hollow bellows.

* * * * *